US008628043B2

(12) United States Patent
Suze

(10) Patent No.: US 8,628,043 B2
(45) Date of Patent: Jan. 14, 2014

(54) PARACHUTE SAFETY DEVICE

(75) Inventor: M. Gael Suze, Trie-Chateau (FR)

(73) Assignee: Aerazur, Plaisir (FR)

( * ) Notice: Subject to any disclaimer, the term of this patent is extended or adjusted under 35 U.S.C. 154(b) by 49 days.

(21) Appl. No.: 13/173,291

(22) Filed: Jun. 30, 2011

(65) Prior Publication Data

US 2012/0025028 A1 Feb. 2, 2012

(30) Foreign Application Priority Data

Jul. 1, 2010 (EP) ..................................... 10305712

(51) Int. Cl.
*B64D 17/62* (2006.01)
(52) U.S. Cl.
USPC .......................................... 244/147; 244/149
(58) Field of Classification Search
USPC .......... 244/149, 147, 148, 150, 151 R, 151 A, 244/151 B
See application file for complete search history.

(56) References Cited

U.S. PATENT DOCUMENTS

2009/0127395 A1* 5/2009 Fradet ........................... 244/149

FOREIGN PATENT DOCUMENTS

| EP | 2060488 A2 | 5/2009 |
| FR | 2923801 A1 | 5/2009 |

* cited by examiner

*Primary Examiner* — Timothy D Collins
*Assistant Examiner* — Brian M O'Hara
(74) *Attorney, Agent, or Firm* — Bachman & LaPointe, P.C.

(57) ABSTRACT

The safety device comprises a first bridle connecting a pilot chute of the reserve parachute to a deployment bag, a second bridle connecting the main parachute to the first bridle, a pin fastened to this first bridle and passed in a releasable manner in a loop formed on a locking bridle fastened to the locking pin and passed through a loop fastened to the second bridle and two eyelets formed through the first bridle.

13 Claims, 6 Drawing Sheets

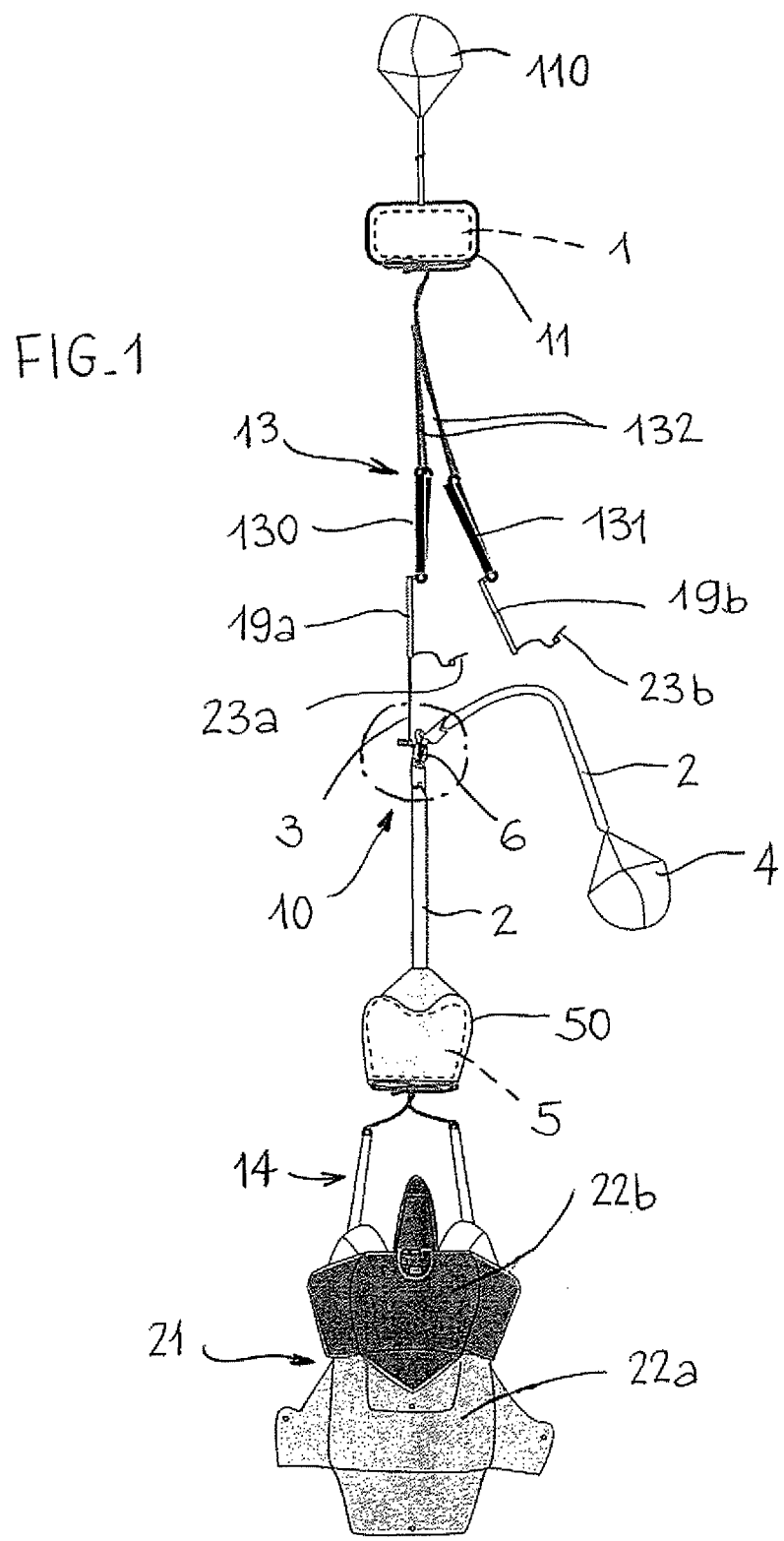
FIG_1

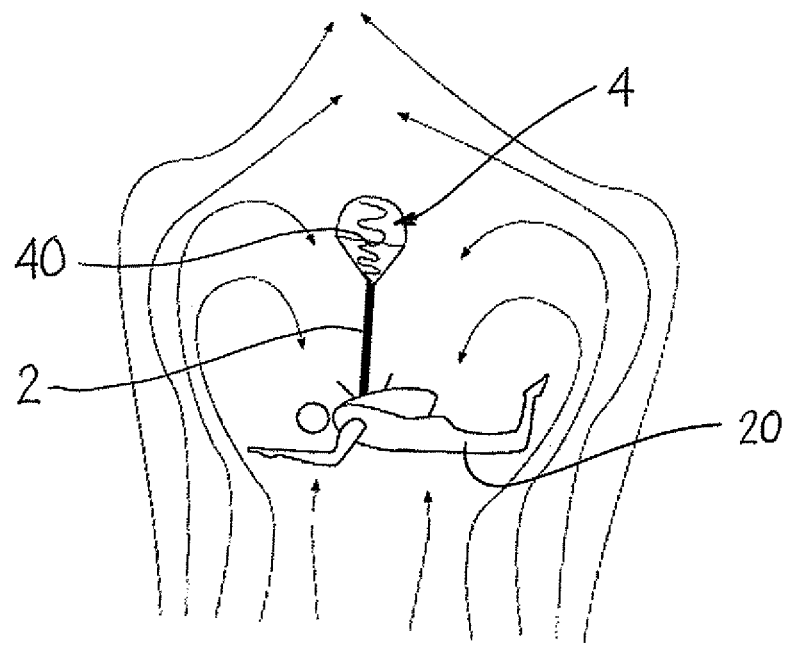
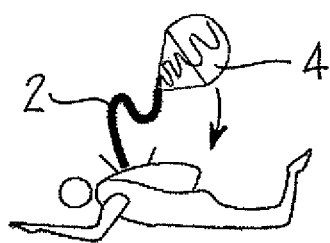
FIG. 4
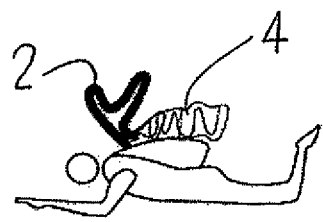

FIG_6

PARACHUTE SAFETY DEVICE

BACKGROUND

The invention relates to a safety device, more specifically, a safety device for the release of the main parachute and opening of a reserve parachute.

As disclosed in EP 2 060 488, such a safety device is already known which, like that of the invention, comprises:

a first bridle connecting a reserve parachute pilot chute (hereafter "reserve pilot chute") to a bag for deploying this parachute, a second bridle connecting the main parachute to the first bridle, and at least a locking pin linking the main parachute to the first bridle, on a first side of it, and passed through (engaged), liberally, in at least a locking loop formed on a locking bridle fastened to the locking pin and passed through successively:

a fastening loop fastened to the second bridle, towards an end thereof, and a first eyelet formed through the first bridle.

Difficulties remain. Amongst other things, there remains a need to effectively counter, even in delicate circumstances, a tendency for the locking pin to become released by using the retention force transmitted by the drag of the released main parachute (situation called "cutaway").

Furthermore, the situations where contrary efforts or stresses may counteract the operation of the reserve pilot chute in a situation where the latter is activated directly by the user without preliminary release of the main parachute (situation called: direct emergency action), while securing the locking pin which should not become released at random, should be avoided.

SUMMARY OF THE INVENTION

In order to put forth a solution to the whole or part of what precedes, it is proposed that the aforementioned safety device is such that:

the first bridle exhibits a second eyelet formed through it, closer to the fastener of the locking pin at the first bridle than the first and where the locking bridle passes, towards the second side, opposite to the first, of the first bridle, before passing, in the opposite direction, in the first eyelet, and the locking bridle is adapted so that the fastening loop fastened to the second bridle may slide freely along said second side of the first bridle, between the first and second eyelets.

Thus, without twisting of the concerned area of the bridles above:

it will be preferred, between drag of the main parachute and drag of the reserve pilot chute, a power ratio in favor of the main parachute: the same variable is concerned, namely the true air speed, which is identical for both and the surface ratio between the main parachute and reserve pilot chute is typically higher than 2, as long as the main parachute/locking bridle assembly is effectively tensed, the connection between the first and second bridles will be active in an efficient way, whatever the tensile strength exerted by the reserve pilot chute is, in a situation of direct activation of the reserve pilot chute (case where the main parachute has thus remained in the bag, which can be typically the harness of the parachutist, hereafter bag-harness), no harmful tension will be exerted by the second bridle, via its fastening loop, on the locking bridle fastened to the locking pin.

In order to avoid the interferences of functions and unexpected jamming, it is advised that after having passed through the fastening loop, the locking loop of the locking bridle passes directly through the first eyelet of the first bridle.

Thus, in particular, it is not in this manner that a connection with the flap of the harness bag will be ensured.

With the provisions which precede, or at least those pertaining to the second eyelet and to the free sliding of the locking bridle, one will be able furthermore to favorably provide that, in the state of the locking pin passed through the locking loop, the first bridle exhibits at least a fold located between the fastening location of said locking pin on this first bridle and the second eyelet, and that no means for maintaining said fold is provided between the two facing flaps of this fold.

Although it is proven that no such means for maintaining the formed fold (consisting in particular in a seam or in a magnetic connection in the aforementioned patent or in FR 2 923 801) is necessary nor even useful here. Despite this, sufficient safety is ensured during the release of the main parachute and the extraction of the reserve parachute, thanks to the aforementioned provisions.

If necessary, in order to prevent that such a bridle or element that it carries gets unexpectedly stuck and/or for general folding ease or even so that the parachutist be confident in it, it is advised that whole or part of the following provisions be implemented:

in the aforementioned engaged state of the locking pin, the locking bridle is positioned on a flap adapted to come over a storage space (typically called: emergency container) of a harness bag which receives the deployment bag of the reserve wherein the reserve canopy is folded, said locking bridle thus being positioned by means of a leg engaged in a pocket of the flap, this leg is fastened to the fastening loop in which the locking bridle passes, always in the engaged state of the locking pin, the latter is positioned on a flap of a harness bag (which can be the aforementioned one), by means of a pocket of this flap which receives it, an elastic return means under which the locking pin passes when it is engaged in the locking loop thus presses this locking pin against the first bridle, while maintaining it.

According to another aspect, the invention further relates to a parachute including a main parachute, a reserve parachute and the abovementioned safety device.

BRIEF DESCRIPTION OF THE DRAWINGS

Other characteristics of this invention will become more apparent from the description which follows wherein:

FIG. 1, shows a cutaway situation of the main parachute (where, following an incident, the main parachute remains conditioned in its deployment bag), FIG. 4 illustrates the retention potentiality of the device of the invention at the time of a kinematics of procedure of direct emergency

DETAILED DESCRIPTION OF THE PREFERRED EMBODIMENT(S)

Figure 3:
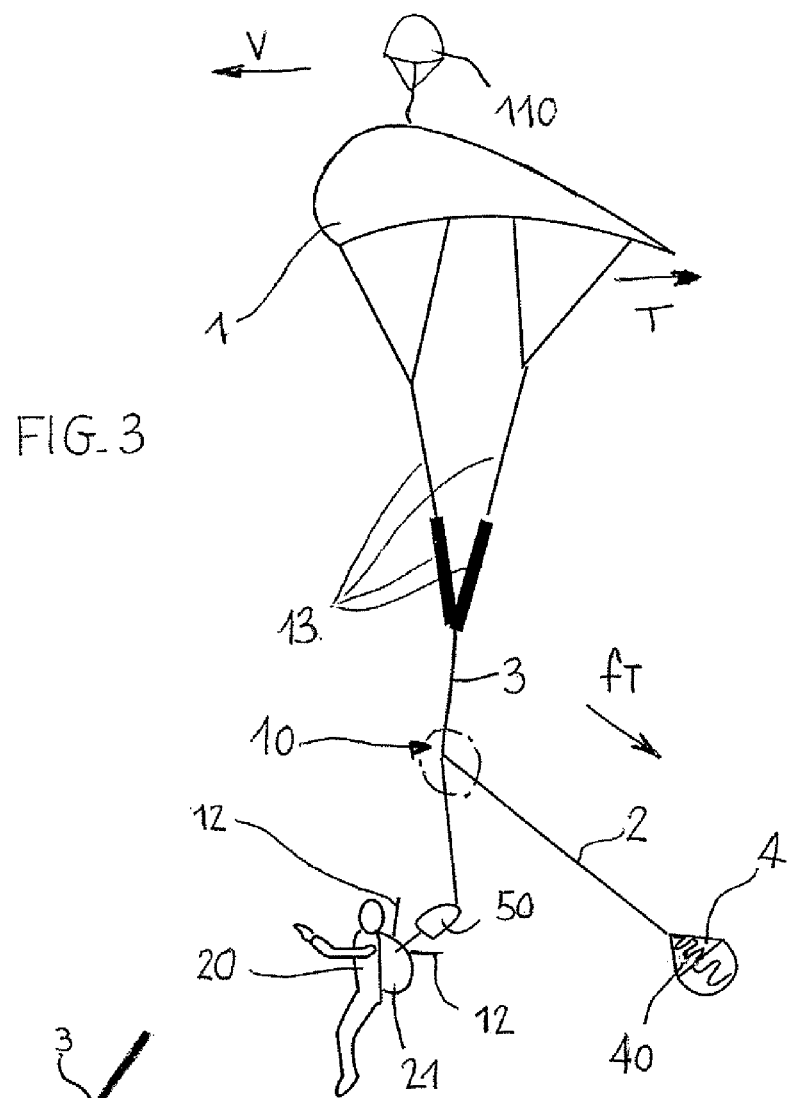
FIG. 3, shows a configuration of release of the main parachute extracting the reserve parachute by deactivating the reserve pilot chute.

FIG. 1, the device 10 of the invention is represented during a dysfunction: the incident consists in a jamming of the main parachute 1 in its deployment bag 11. This situation is brought to continue without progress towards the stage represented in FIG. 3 where the main parachute 1 is brought out of its deployment bag. The risers and lines of the parachute (respective reference marks 132,130,131; general reference mark: connection 13, FIGS. 1, 3) are disconnected from the harness bag 21 (withdrawn broaches 23*a* and 23*b*). The drag generated by the pilot chute 110 and the deployment bag is sufficient to act on device 10 according to the same kinematics as FIG. 3.

FIG. 3, the extraction of the reserve parachute is underway, while the reserve pilot chute 4 is being deactivated.

Figure 5:
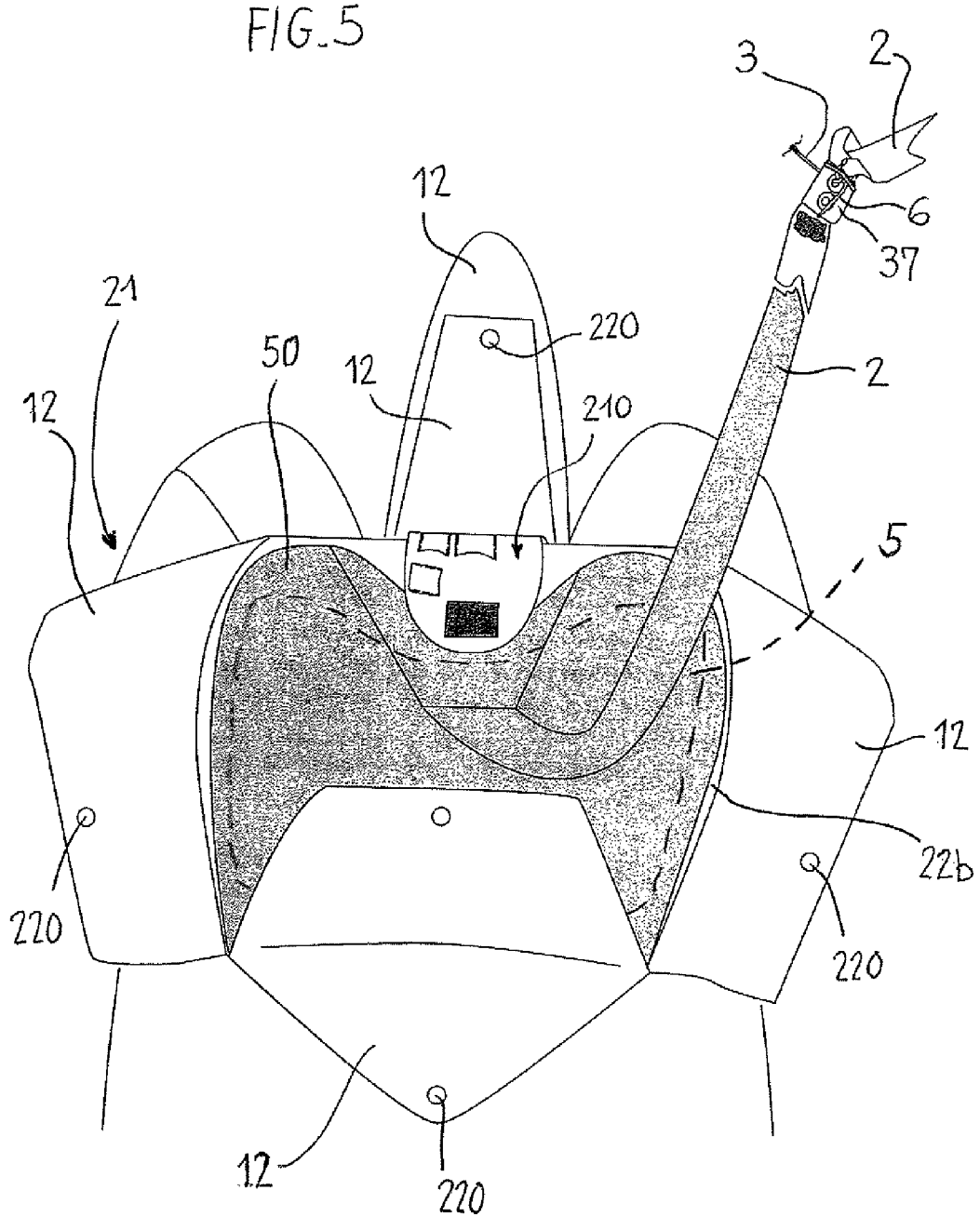
FIGS. 5 to 7 show structural and assembling details of the device of the invention on the harness bag of the parachutist.

Via the lines 132 then, here, the left riser 130 and the left bridle 19*a* (see the detail of the connection 13 on FIG. 1), the main parachute thus uses a connecting bridle 3 (here called "second bridle") connected to another connecting bridle 2 (here called "first bridle") connecting the reserve pilot chute 4 to a deployment bag 50 of the reserve parachute thus out of the emergency container 22*b*, by opening the flaps 12 which normally close the access to the bag 50 at this location (see FIG. 5). The whole is secured to the parachutist 20 whom thus wears this bag/harness 21 where the various aforementioned elements were initially folded. Thus, reference mark 21 is a container securing a harness adjusted around the parachutist, a main container 22*a* containing the main deployment bag 11 and the emergency container 22*b* containing the deployment bag 50 in which is folded, the reserve parachute 5 originally, as schematized in FIG. 1 where the general reference mark 14 shows the reserve risers forming a connection between the harness bag 21 and the reserve deployment bag 50.

The second bridle 3 thus connects the main parachute 1 to the first bridle 2.

As one has understood, the role of device 10 in the case above known as "cutaway", is to couple the main parachute 1 with the extraction of the reserve parachute 5 in order to optimize the latter time of extraction. This device must allow for a suitable extraction of the "standard" emergency extraction system (including pilot chute 4 and bridle 2), in the event of direct emergency procedure (i.e. when the main parachute 1 has not been deployed effectively and therefore cannot be used as a pilot chute). It must thus, be deactivated in the least possible disturbing manner in the event of the opening of the emergency container 22*b* and the springing out of the reserve pilot chute 4.

Figure 2:
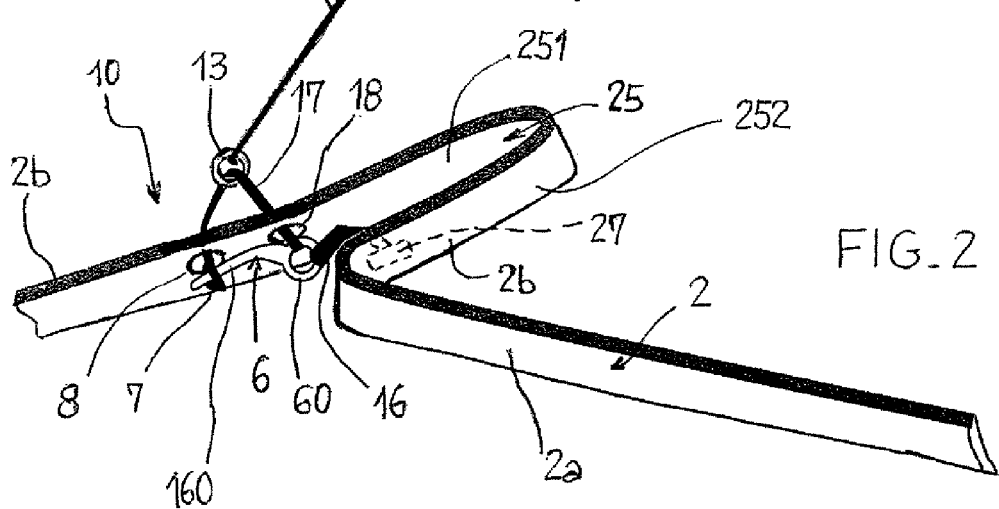
FIG. 2, shows the device of the invention in an active situation of connection between the first and second bridles.

More clearly on FIG. 2, one may see that for this purpose, this device 10 comprises (at least) a locking pin 6 fastened to the first bridle 2, on a first side 2*a* of it.

In the example, a textile leg 16 is at an end 27 sewn to the bridle 2 and exhibits on the other side a loop in which passes the annular head 60 of the locking pin 6. Another means for attaching to the bridle 2 could have been retained.

In the illustrated active situation, the system is operational: the pin 6 passes freely through the locking loop formed on the locking bridle 17 fastened to this locking pin. This was established during the conditioning of the reserve canopy 5 in the harness bag 21, precisely here on the flap 210, over the bag 50.

In the example, the locking bridle 17 is fixed or attached securely to the head 60 of the locking pin 6 by a loop which surrounds this head. Furthermore, this bridle 17 is, in this situation, passed through successively:

the fastening loop 13 fastened to the second bridle 3, towards an end thereof, and a first eyelet 8 formed through the first bridle 2.

Unlike what is revealed in EP 2 060 488 (FIG. 2E) and for an operational safety, the following is advisable:

the first bridle 2 exhibits a second eyelet 18 formed through it, closer to the fastener 27 of the locking pin 6 to the bridle 2 than the first eyelet 8, then, one can note in FIG. 2 that, in the aforementioned active situation and based on its fixing to the pin 6 on the side 2*a* of the first bridle 2, the locking bridle 17 passes first with the locking loop 7 in the lead, through the second eyelet 18, thus, in the direction of the second side 2*b* (opposite to 2*a*) of the bridle 2, where it crosses the fastening loop 13, before passing, in the opposite direction, through the first eyelet 8, to emerge again on the first side 2*a*, where the locking loop 7 thus receives the locking pin 6.

another important point: the locking bridle 17 is adapted so that the fastening loop 13 fastened to the second bridle 3 may slide freely along the second side 2*b* of the bridle 2, between the first and second eyelets 8,18.

This having been specified, let us return to the situation of release of FIG. 1 or 3 "cutaway" where the second connecting bridle 3 is thus, under tension.

FIG. 1, one may note that this second connecting bridle 3 is connected to the bridle 19*a*, which comprises, at its end opposing to that fastened to the riser 130, a broach 23*a* intended for the closing of the emergency container 22*b*.

During the action of release of the main parachute, the disengagement of the risers 130 and 131 from the harness bag 21 assembly caused the tensing of the intermediate bridles 19*a* and 19*b* then the withdrawal of the broaches 23*a* and 23*b* that each one thus carries at its end opposed to that by which it is connected to one of the two lines 132 of the group of lines, via the risers.

During this withdrawal, the broaches 23*a* and 23*b* were drawn away from the emergency container 22*b*, making it possible for the latter to open by spacing apart the flaps 12, thus, which released the reserve pilot chute 4.

For example by releasing the inner spring 40 that it may contain (see FIG. 3), this pilot chute 4 has in fact, due to this opening, been expelled from the emergency container 22*b*, whereas the second connecting bridle 3 continued to be stressed successively by the bridle 19*a*, the riser 130 and the group of lines 132 suspended under the main deployment bag 11 exited from the main container 22*a* and above which the pilot chute 110 of the main parachute had itself been expelled (via again the release for example of an internal spring that it may also contain).

In such a release configuration of the main parachute 1, as on FIG. 3, that which is opposed to the propensity to the unlocking of device 10 for releasing this main parachute and the opening of the reserve parachute 5 is the retention force transmitted by the drag T of the main parachute released, via the bridle 3, as long as the pin 6 is engaged in the loop 7, as on FIG. 2.

The power ratio between the drag of the main parachute 1 and that of the reserve pilot chute 4 is typically in favor of the main parachute because it is function of the same variable which is that of the true air speed V.

While the main parachute or the main parachute assembly/device 10 is under tension (tensed bridle 17 and pin engaged), this pin 6 remains in place (active state), without notable risk of disengagement whatever the tensile strength fT exerted by the reserve pilot chute 4; see FIG. 2 again.

In the situation of direct activation of the reserve pilot chute 4 (the main parachute 1 and the deployment bag 11 have thus remained in the main container 22*a*), no tension is exerted by the second bridle 3 on the locking bridle 17 in the locking loop 7 through which the pin 6 still passes. Due to this, the latter may thus slip out of the loop 7, which separates the bridles 2 and 3 and particularly releases from any connection with the main parachute 1 the reserve pilot chute assembly including the pilot chute 4, bridle 2 and the deployment bag 50.

It is worth noting that, with the locking pin 6 engaged, the presence of two eyelets 8, 18, as well as the free sliding of the locking bridle 17 along the side 2*b* of the first bridle 2 particularly promote at the same time the effectiveness of the device 10 when it is active (FIG. 2) and its deactivation celerity when the locking pin 6 can be released from the loop 7 following a fluttering of the second bridle 3 which is no longer/not tensed, whereas the inflating strength of the reserve pilot chute 4 which is deployed leads to a sufficient traction on the first bridle 2 to stress the separation between the bridles 2 and 3.

FIG. 4 illustrates what is likely to happen if, on the assumption of the above operation, the retention strength or engagement of the locking pin 6 in the loop 7 remains higher than the resultant extraction force of the reserve parachute 5 created by the exit of the reserve pilot chute 4 (with then: drag primarily of this pilot chute, push of the spring 40, weight substantially of said pilot chute and turbulences with return of the relative airflow). A chaotic resulting force can now stress the (back of parachutist 20) just-exited pilot chute 4 downwards. In certain random cases this pilot chute may even relapse, which will at least delay the opening of the reserve parachute, with in addition the risk of entanglement of the first bridle 2 and/or of the deflated pilot chute 4, when both fall on the parachutist harness bag.

The invention limits the risks of such a situation.

Thanks to the assembly described above, substantially no tension or parasitic stress comes moreover to disturb the release capacity of the pin 6, particularly no connection with the flap of the concerned bag (in particular with the emergency container 22*b*).

A comparable remark may be made concerning the fact that one advises moreover that, always in the state of the locking pin 6 passed through the locking loop 7, and as shown in FIG. 2, the first bridle 2 exhibits a simple U shaped fold 25 (even double W shaped) located between the location 27 of the fastener of said locking pin 6 on this first bridle and eyelet 8 (second eyelet).

Figure 7:
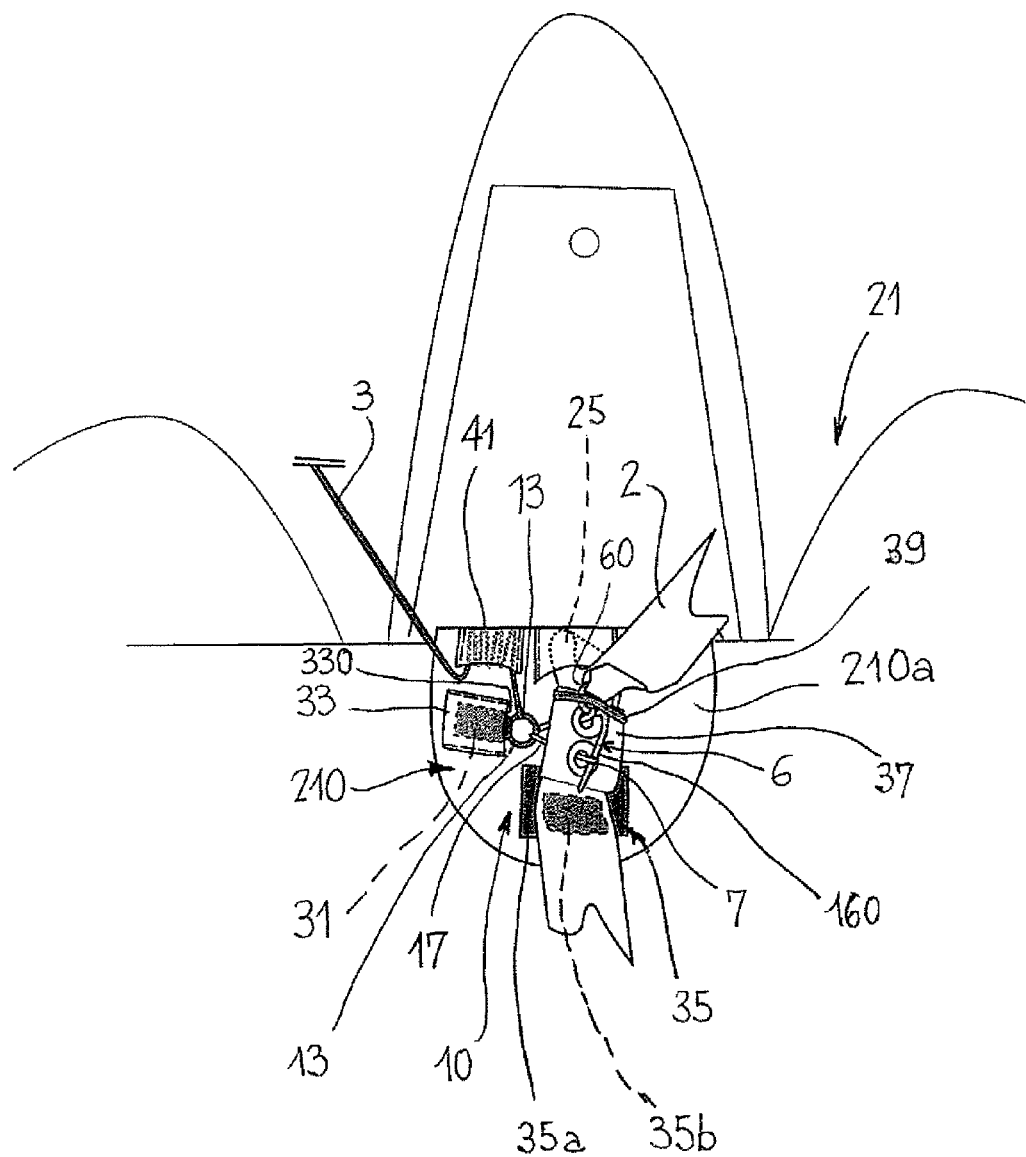

No means for maintaining the fold is provided between the two facing flaps, such as 251, 252, of this fold. Pertaining to this subject, one will note that with close frictional force, typically low at 1-3 daN, the unfolding of the fold 25 which makes it possible to release the locking pin 6 following the aforementioned traction situation on the only bridle 2, hardly undergoes here any other constraints than those due to the preferred installation of the device 10 in various housings allowing for its operational storage on the flap 210 of the emergency container 22*b*, as shown in FIG. 7. Thus, one will avoid that the device 10 moves in a manner that is harmful once the harness bag is conditioned for the jump, in particular upon activation of such and such portion of the parachute (regarded as a whole).

Regarding this point, one may note that on FIG. 7, in said engaged state of the locking pin 6, and device 10 stored in the bag 21, the locking bridle 17 is positioned on a flap 210 of the emergency container 22*b*, portion of the harness bag 21 worn by the parachutist.

As shown in FIG. 5, the flap 210 is adapted to come over the storage space 22*b* of the harness bag 21 wherein is stored the bag 50 in which the reserve parachute 5 is thus folded, the space 22*b* associated with the flaps 12 and 210 constituting the assembly which has been called emergency container. The locking bridle 17 can then be favorably positioned by means of a leg 31 engaged in a pocket 33 of the flap 210 provided (fixed) on the external side 210*a* of this flap, when it is folded over the reserve deployment bag 50 conditioned in the space 22*b* as schematized in FIG. 5, 6 or 7.

Figure 6:
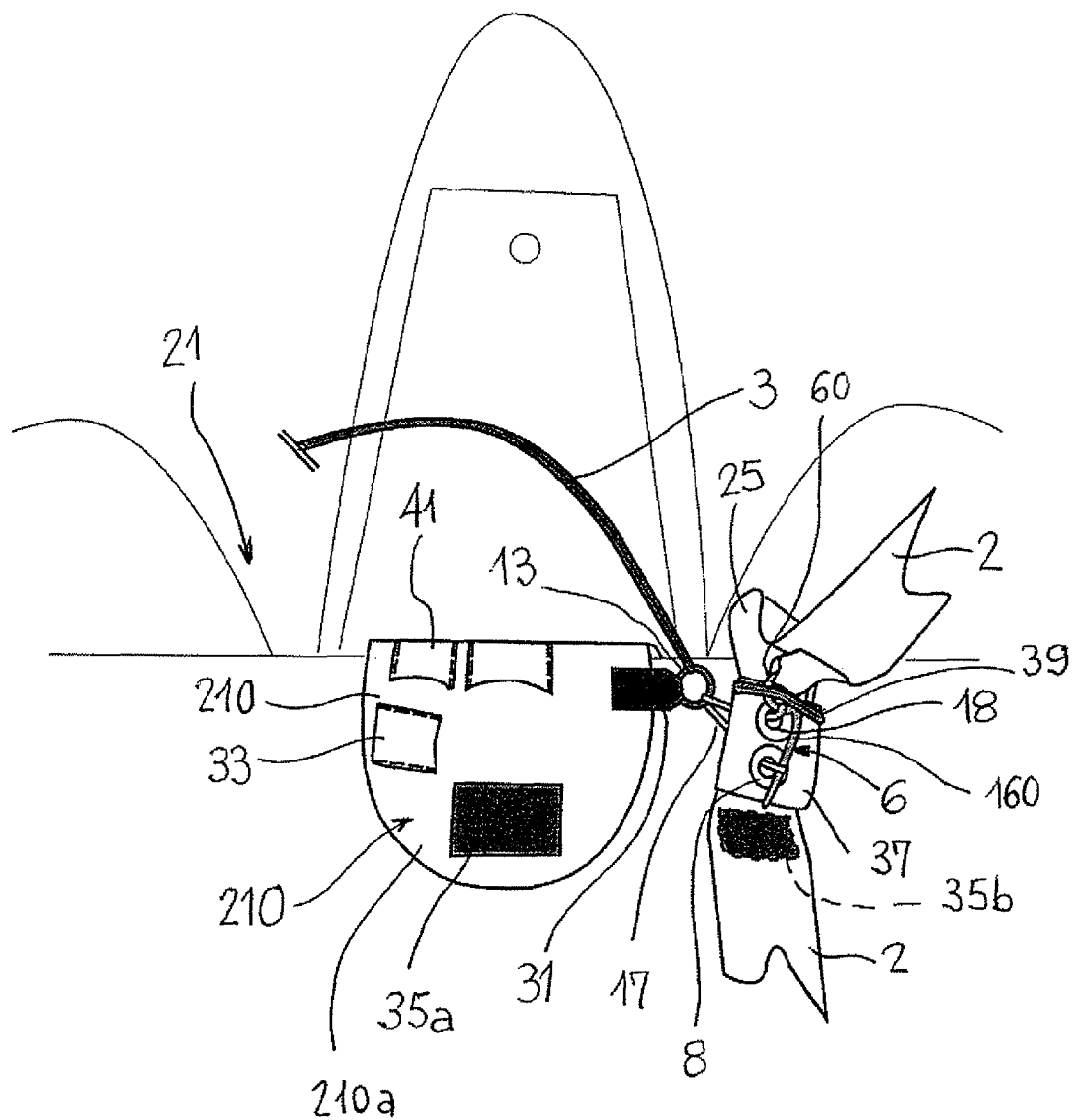

Preferably, this leg 31 will be fastened to the fastening loop 13 (FIGS. 6, 7). The leg will be relatively rigid (for example thick fabric) and the internal space of the pocket 33 not too tight so that it does not obstruct the exit of the leg 31 during the expulsion of the pilot chute 4, for example by releasing its inner spring 40 upon opening of the flaps 12, typically after withdrawal of the eyelets 220 from a restraining pin (not represented).

In a comparable way, it is recommended that, when the locking pin 6, is in the engaged state like FIGS. 2 and 7, the first bridle 2 carrying this locking pin is positioned on a flap, here flap 210, side 210*a*, adapted to come over the reserve deployment bag 50 conditioned within the storage space 22*b* of the harness bag 21. This positioning here favorably ensured by means of a self-gripping strip 35 (the terms scratch or "Velcro"™ are also used) in two portions 35*a*, 35*b* provided respectively on the flap and the first bridle. Its position on the first bridle is preferably on the opposite side of the fold 25 with respect to the needle 6 engaged in the loop 7; see FIG. 7.

As specified above, the role of the self-gripping strip 35 is to position the first bridle 2 on the flap; there is no expected restraining effect of the pin 6 or bridle 17.

Moreover it is preferable that the pocket 33 is positioned laterally with respect to the portion 35*a* of the self-gripping strip 35, at a distance substantially corresponding to that separating the loop 13 from the portion 35*b*. The opening 330 of the pocket 33 is directed towards portion 35*a*.

Particularly to promote the good maintenance of a self-gripping strip 35, it will still be preferred that in the place where the locking pin 6 is engaged in a releasable manner in the locking loop 7, first bridle 2 exhibits a structural reinforcement 37; FIG. 7.

Another recommendation: that, in the above mentioned active position and thus illustrated in FIG. 7 where the pin 6 is engaged in the locking loop 7, an elastic return means 39 under which this pin passes (see also FIG. 6) presses the pin against the first bridle 2 by maintaining it like that. Once again the objective is to position the elements, here the pin 6; there is no expected restraining effect.

Favorably, the head 60 which will end this locking pin 6 at one end will come in the form of a closed ring (FIG. 2) where the first bridle 2 will thus be fastened and the elastic return means 39 will be preferably an elastic band arranged to cover this closed ring when the pin 6 is thus engaged in the loop 7; FIG. 7.

Another useful consideration for the same expected effect of good maintenance in the stored position in the bag of FIG. 7: that the pin 6 exhibits at an end a/the closed ring 60 which extends substantially tangentially by an extended portion 160 around which the locking loop 7 engages.

As for this loop 7, it is advisable, once more for safety, but also for an effective sliding of the bridle 17 in the situation of FIG. 2 that the second bridle 3 comprises, as a loop 13, a closed metal ring, around which passes in solid loop (folded unto itself) the related end of the bridle 3, the loop 7 of the bridle 17 being on the other hand preferentially a loop of bridle folded unto itself, for a better contact with the pin 6 to maintain, as explained above.

In FIG. 7, it is worth noting that, leg 31 engaged in the pocket 33, the loop or ring 13 remains on the outside. At the vicinity of this loop 13, the second bridle 3 thus on the other hand locally coiled or folded in laces in a second pocket 41. Thus, the risks of entanglement are limited. This second pocket 41 is formed on the side 210a of the flap 210. It opens in the direction of the pocket 33. The two pockets 33, 41 and the portion of the strip 35a are achieved at immediate vicinity of each other.

The invention claimed is:

1. A device for releasing a main parachute and opening a reserve parachute connected to a pilot chute and a deployment bag, the device comprising:
    a first bridle fastening the pilot chute to the deployment bag,
    a second bridle fastening the main parachute to the first bridle, and
    a locking pin,
    a locking bridle having a locking loop,
    a first fastening for fastening the locking pin to the first bridle, on a first side thereof, said locking pin passing, in a free manner, in the locking loop,
    a second fastening for fastening said locking bridle to the locking pin,
    a fastening loop fastened to the second bridle, towards an end thereof, and,
    a first eyelet formed through the first bridle,
wherein:
    said second fastening permanently fastens the locking bridle to the locking pin even when said locking pin is out of said locking loop and the first bridle is separated from the second bridle,
    said fastening loop is permanently fastened to the second bridle, towards said end thereof, even when the locking pin is out of said locking loop and the first bridle is separated from the second bridle,
    the first bridle is provided with a second eyelet formed therethrough, said second eyelet being located, along the first bridle, at a longer distance from said first fastening of the locking pin than the distance between the first eyelet and said first fastening of the locking pin to the first bridle is,
    from said second fastening of the locking bridle to the locking pin, the locking bridle passes:
        first through the second eyelet, towards a second side of the first bridle opposite to a first side of the first bridle,
        then through the fastening loop,
        and then, in an opposite direction, through the first eyelet, and,
    said fastening loop fastened to the second bridle can slide freely along said second side of the first bridle, between the first and second eyelets.

2. The device according to claim 1, wherein after being passed through the fastening loop, the locking loop of the locking bridle passes directly through the first eyelet.

3. The device according to claim 1, wherein, in a state of the locking pin passed through the locking loop, the first bridle exhibits a fold having two facing flaps and located between the second eyelet and the location of the fastening of said locking pin to the first bridle, and no means for maintaining said fold is provided between the two facing flaps thereof.

4. The device according to claim 1, wherein in a state of the locking pin passed through the locking loop, the locking bridle is positioned on a flap adapted to come over a storage space of a harness bag which receives a reserve deployment bag in which the reserve parachute is folded, said locking bridle thus being positioned by means of a leg engaged in a pocket of the flap.

5. The device according to claim 4, wherein said leg is fastened to the fastening loop in which passes the locking bridle.

6. The device according to claim 1, wherein, in a state of the locking pin passed through the locking loop, the first bridle fastened to said locking pin is positioned on a flap adapted to come over a storage space of a harness bag which receives a reserve deployment bag in which the reserve chute is folded, by means of a self-gripping strip in two portions respectively provided on the flap and the first bridle.

7. The device according to claim 1, wherein an elastic return means under which passes the locking pin when it is engaged in the locking loop presses the locking pin on the first bridle by maintaining said locking pin.

8. The device according to claim 7, wherein the locking pin ends at one end with a closed ring with which it is fastened to the first bridle and the elastic return means is an elastic band arranged to cover said closed ring when the locking pin is engaged in the locking loop.

9. The device according to claim 1, wherein at the location where the locking pin is engaged in a releasable manner in the locking loop, the first bridle is provided with a structural reinforcement.

10. The device according to claim 1, wherein the locking pin exhibits at one end a closed ring which extends in a substantially tangential manner by an extended portion around which the locking loop passes.

11. The device according to claim 1, wherein the fastening loop is in the form of a bridle loop in which passes the locking bridle, and the fastening loop of the second bridle comprises a closed metal ring.

12. A parachute device comprising:
    a main parachute,
    a reserve parachute connected to a pilot chute and a deployment bag,
    a releasing device for releasing the main parachute and opening the reserve parachute, the releasing device comprising:
        a first bridle fastening the pilot chute to the deployment bag,
        a second bridle fastening the main parachute to the first bridle, and,
        a locking pin,
        a locking bridle having a locking loop,
        a first fastening for fastening the locking pin to the first bridle, on a first side thereof, said locking pin passing, in a free manner, in the locking loop,
        a second fastening for fastening said locking bridle to the locking pin,
        a fastening loop fastened to the second bridle, towards an end thereof, and,
        a first eyelet formed through the first bridle,
    wherein:
        the first bridle is provided with a second eyelet formed therethrough, said second eyelet being located, along the first bridle, at a longer distance from said first fastening of the locking pin than the distance between the first eyelet and said first fastening of the locking pin to the first bridle is,
        from said second fastening of the locking bridle to the locking pin, the locking bridle passes:

first through the second eyelet, in a first direction, towards a second side of the first bridle opposite to a first side of said first bridle, then through the fastening loop, and then, in a second direction opposite to the first one, through the first eyelet, and the fastening loop fastened to the second bridle can slide freely along said second side of the first bridle, from the first eyelet and to the second eyelet and conversely.

13. A parachute device comprising:

a main parachute, a reserve parachute connected to a pilot chute and a deployment bag, a releasing device for releasing the main parachute and opening the reserve parachute, the releasing device comprising:

a first bridle fastening the pilot chute to the deployment bag, a second bridle fastening the main parachute to the first bridle, and a locking pin, a locking bridle having a locking loop, a first fastening for fastening the locking pin to the first bridle, on a first side thereof, said locking pin passing, in a free manner, in the locking loop, a second fastening for fastening said locking bridle to the locking pin, a fastening loop fastened to the second bridle, towards an end thereof, and, a first eyelet formed through the first bridle, wherein:

the first bridle is provided with a second eyelet formed therethrough, said second eyelet being located, along the first bridle, at a longer distance from said first fastening of the locking pin than the distance between the first eyelet and said first fastening of the locking pin to the first bridle is, from said second fastening of the locking bridle to the locking pin, the locking bridle passes:

first through the second eyelet, in a first direction, towards a second side of the first bridle opposite to a first side of said first bridle, then through the fastening loop, and then, in a second direction opposite to the first one, through the first eyelet, and, the locking bridle extends continuously from the locking loop to the second fastening, so that the fastening loop fastened to the second bridle can slide freely along said second side of the first bridle, from the first to the second eyelets and conversely.

* * * * *